United States Patent
Hsu (10) Patent No.: US 9,882,418 B2
(45) Date of Patent: Jan. 30, 2018

(54) SWITCHING MODE CHARGER FOR CHARGING SYSTEM

(71) Applicant: MEDIATEK INC., Hsin-Chu (TW)

(72) Inventor: Chih-Yuan Hsu, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 106 days.

(21) Appl. No.: 14/443,654

(22) PCT Filed: Apr. 22, 2014

(86) PCT No.: PCT/CN2014/075985
§ 371 (c)(1),
(2) Date: May 18, 2015

(87) PCT Pub. No.: WO2014/173293
PCT Pub. Date: Oct. 30, 2014

(65) Prior Publication Data
US 2015/0280486 A1    Oct. 1, 2015

Related U.S. Application Data

(60) Provisional application No. 61/814,601, filed on Apr. 22, 2013.

(51) Int. Cl.
*H02J 7/00* (2006.01)
*H02J 7/04* (2006.01)
(Continued)

(52) U.S. Cl.
CPC .............. *H02J 7/045* (2013.01); *B60L 11/185* (2013.01); *B60L 11/1816* (2013.01);
(Continued)

(58) Field of Classification Search
CPC .. H02J 7/04; H02J 7/052; H02J 7/0068; H02J 7/5045; B60L 11/1811; B60L 2210/12; B60L 2210/14; G01R 31/361
(Continued)

(56) References Cited

U.S. PATENT DOCUMENTS 6,037,755 A    3/2000   Mao
2007/0285065 A1   12/2007   Summit
(Continued)

FOREIGN PATENT DOCUMENTS

| CN | 101018012 A | 8/2007 |
| CN | 101252316 A | 8/2008 |
| CN | 102694469 A | 9/2012 |

OTHER PUBLICATIONS

"International Search Report" dated Jul. 23, 2014 for International application No. PCT/CN2014/075985, International filing date:Apr. 22, 2014.

*Primary Examiner* — Paul Dinh
(74) *Attorney, Agent, or Firm* — Wolf, Greenfield & Sacks, P.C.

(57) ABSTRACT

A switching mode charger capable of performing mode switching to adjust and output charging current for a battery or driving current for an external circuit element includes an input terminal, an output terminal, a Buck-Boost converter, and a controller. The Buck-Boost converter generates a voltage at the input terminal according to a voltage at the output terminal or generates a voltage at the output terminal according to a voltage at the input terminal. The controller dynamically selects an operation mode from a plurality of operation modes as an operation mode of the Buck-Boost converter according to at least one of the voltage change and the current change that are associated with the Buck-Boost converter, wherein the Buck-Boost converter dynamically performs mode switching according to the operation mode selected by the controller so as to adjust and output the charging current or the driving current.

20 Claims, 4 Drawing Sheets

(51) Int. Cl.
*B60L 11/18* (2006.01)
*H02M 3/158* (2006.01)

(52) U.S. Cl.
CPC ......... *B60L 11/1818* (2013.01); *H02J 7/0052* (2013.01); *H02J 7/0077* (2013.01); *H02M 3/1582* (2013.01); *B60L 2210/12* (2013.01); *B60L 2210/14* (2013.01); *B60L 2210/30* (2013.01); *B60L 2240/547* (2013.01); *B60L 2240/549* (2013.01); *H02J 2007/0059* (2013.01); *Y02T 10/7005* (2013.01); *Y02T 10/7072* (2013.01); *Y02T 10/7225* (2013.01); *Y02T 10/7233* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(58) Field of Classification Search
USPC .......................................... 320/139, 141, 145
See application file for complete search history.

(56) References Cited

U.S. PATENT DOCUMENTS

| | | | |
|---|---|---|---|
| 2009/0121684 A1* | 5/2009 | Hussain | H02J 7/0093 320/139 |
| 2009/0146623 A1 | 6/2009 | de Cremoux | |
| 2010/0007316 A1* | 1/2010 | Miller | H01L 27/0207 323/282 |
| 2010/0118567 A1* | 5/2010 | Liu | H02M 3/33515 363/31 |
| 2010/0134077 A1* | 6/2010 | Krajcovic | H02J 1/14 323/234 |
| 2010/0164449 A1* | 7/2010 | Dwarakanath | H02M 3/1582 323/282 |
| 2010/0231173 A1* | 9/2010 | Andrea | H02J 7/022 320/137 |
| 2011/0089915 A1 | 4/2011 | Qiu | |
| 2011/0156683 A1* | 6/2011 | Zhang | H02M 3/1582 323/283 |
| 2012/0169126 A1 | 7/2012 | Tötterman | |
| 2012/0229110 A1* | 9/2012 | Huang | H02M 3/1582 323/282 |
| 2012/0274295 A1* | 11/2012 | Lin | H02M 3/1582 323/282 |
| 2012/0299553 A1* | 11/2012 | Menegoli | H02J 7/0052 320/140 |
| 2013/0021015 A1* | 1/2013 | Moussaoui | H02M 3/1582 323/311 |
| 2013/0334987 A1* | 12/2013 | Garg | B06B 1/0238 318/116 |
| 2014/0084883 A1* | 3/2014 | Tanabe | H02M 3/1582 323/271 |
| 2014/0169055 A1* | 6/2014 | Fornage | H02M 3/1582 363/132 |
| 2014/0203761 A1* | 7/2014 | Paparrizos | H02M 3/1582 320/107 |

* cited by examiner

SWITCHING MODE CHARGER FOR CHARGING SYSTEM

CROSS REFERENCE TO RELATED APPLICATIONS

This application is a national phase of International Application No. PCT/CN2014/075985, filed Apr. 22, 2014, which claims the benefit of U.S. Application No. 61/814,601 filed Apr. 22, 2013, the entire contents of which are hereby incorporated by reference.

FIELD OF INVENTION

The present invention relates to a charging scheme, and more particularly to a switching mode charger and a method applied into the switching mode charger.

BACKGROUND OF THE INVENTION

With the development of technology and the time, in order to meet user convenience, it is needed to configure a battery having the large capacity within a portable device such as a smart phone device or a tablet device. The battery having the large capacity usually means that it consumes longer charging time especially when a small charging current such as 1 A is used. Accordingly, a large charging current is usually employed by a conventional charger/adaptor device so as to reduce the longer charging time as far as possible. However, in some situations that cable lines losses exist or a large voltage variation is introduced to the input voltage, even though the conventional charger/adaptor device is originally designed to provide a maximum rated large current for battery charging, the conventional charger/adaptor device still outputs/provides a small charging current and cannot provide the rated large current for a battery. Thus, it is important to provide a novel charger device still capable of outputting a large charging current for a battery to effectively reduce the longer charging time even though this charger device is in the above-mentioned situations.

SUMMARY OF THE INVENTION

One of the objectives of the present invention is to provide a switching mode charger capable of performing mode switching to adjust and output a charging current for a battery or a driving current for an external circuit element in response to voltage change or current change, and a corresponding method applied into the switching mode charger, to solve the above-described problems.

According to an embodiment of the present invention, a switching mode charger capable of performing mode switching to adjust and output a charging current for a battery or a driving current for an external circuit element in response to voltage change or current change is disclosed. The switching mode charger comprises an input terminal, an output terminal, a Buck-Boost converter, and a controller. The Buck-Boost converter is used for generating a voltage at the input terminal according to a voltage at the output terminal or generating a voltage at the output terminal according to a voltage at the input terminal. The controller is coupled to the Buck-Boost converter, the input terminal, and the output terminal. The controller is used for dynamically selecting an operation mode from a plurality of operation modes as an operation mode of the Buck-Boost converter according to at least one of the voltage change and the current change that are associated with the Buck-Boost converter, wherein the Buck-Boost converter is arranged to dynamically performing mode switching according to the operation mode selected by the controller, so as to adjust and output the charging current or the driving current.

According to an embodiment of the present invention, a method applied into a switching mode charger capable of performing mode switching to adjust and output a charging current for a battery or a driving current for an external circuit element in response to voltage change or current change is disclosed. The method comprises: using a Buck-Boost converter to generate a voltage at an input terminal according to a voltage at an output terminal or generate a voltage at the output terminal according to a voltage at the input terminal; dynamically selecting an operation mode from a plurality of operation modes as an operation mode of the Buck-Boost converter according to at least one of the voltage change and the current change that are associated with the Buck-Boost converter; and dynamically performing mode switching according to the operation mode selected, so as to adjust and output the charging current or the driving current.

In the above-mentioned embodiments, the switching mode charger integrates the operations of Buck and Boost modes. Also, the switching mode charger uses a switching transistor of the Buck-Boost converter as a current sensing element or uses a power path block as a current sensing element. Thus, this achieves the requirements of low cost and high efficiency. The structure of switching mode charger can be applied for various different kinds of input power sources such as various AC-to-DC adaptors, standard USB host port, USB charging port, car adaptors, and wireless chargers. In addition, the switching mode charger can support chargers that include different input voltages.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
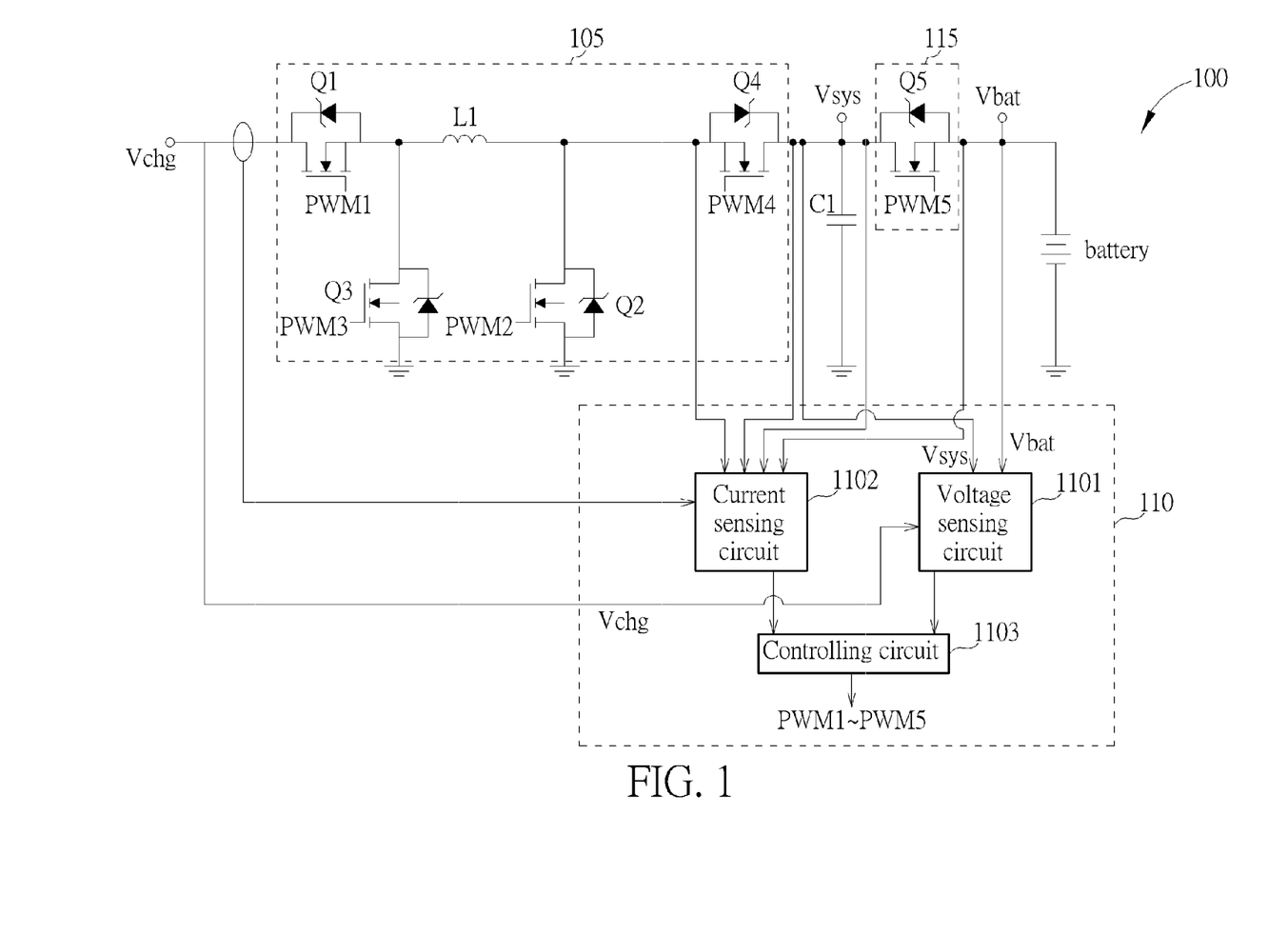
FIG. 1 is a diagram of a switching mode charger according to an embodiment of the present invention.

Please refer to FIG. 1, which is a diagram of a switching mode charger 100 according to an embodiment of the present invention. The switching mode charger 100 is capable of performing mode switching to adjust and output a charging current for a battery or a driving current for an external circuit element that is connected to an input terminal of the switching mode charger 100, in response to voltage change and/or current change. The voltage change may indicate the change of a voltage difference between an input voltage and one of system voltage and battery voltage during a time period. The current change may indicate the change of a current passing through the switching mode charger 100, inputted in to the switching mode charger 100, or outputted by the switching mode charger 100 during a time period. The switching mode charger 100 includes the input terminal, an output terminal, a converter 105 such as a Buck-Boost converter, a controller 110, and a power path block 115. The switching mode charger 100 is used for providing a high efficiency voltage charging for the battery including one cell or more cells, and can be also arranged to reversely using power of the battery to drive the external circuit element (e.g. a USB drive or USB mouse/keyboard) connected to the input terminal of switching mode charger 100; the battery is connected to the output terminal of the switching mode charger 100. That is, the switching mode charger 100 is capable of supplying a corresponding charging/output current for charging the battery according to different conditions of the voltage at the input terminal (i.e. the input charger voltage Vchg) and the voltage at the output terminal (i.e. the system voltage Vsys and/or the battery voltage Vbat); in addition, the switching mode charger 100 can be reversely used for outputting a driving current for driving the above-mentioned external circuit element from the battery by using the power of battery, to support the On-The-Go (OTG) function of USB specification. It should be noted that the switching mode charger 100 can still provide a rated current (or a target large current) for rapidly charging the battery by performing mode switching even though the difference between the battery voltage Vbat and input charger voltage Vchg becomes smaller. The operations will be detailed in the following paragraphs.

The Buck-Boost converter 105 is used for generating a voltage at the output terminal according to a voltage at the input terminal when the switching mode charger 100 outputs the charging current for the battery, and/or generating the voltage at the input terminal according to the voltage at the output terminal when the switching mode charger 100 outputs the driving current for the external circuit element connected to the input terminal. The Buck-Boost converter 105 includes transistors Q1-Q4 where ON/OFF states of transistors Q1-Q4 are controlled by four distinct pulse-width-modulation (PWM) signals PWM1-PWM4 outputted by the controller 110, respectively. The H-Bridge structure is formed by the transistors Q1-Q4. The Buck-Boost converter 105 at least includes three operation modes of a Buck mode, a Boost mode, and a Buck-Boost mode. Which mode the Buck-Boost converter 105 operates is dependent upon the ON/OFF states of transistors Q1-Q4. The ON/OFF states of transistors Q1-Q4 are controlled by the controller 110. The controller 110 generates and uses the PWM signals PWM1-PWM4 to respectively control the states of transistors Q1-Q4, and the Buck-Boost converter 105 may enter an operation mode from another one or switch between the above-mentioned operation modes according to the ON/OFF states of transistors Q1-Q4. The generation of the PWM signals PWM1-PWM4 outputted by the controller 110 depends on the current which passes through the switching mode charger 100 wherein the current may be used for charging the battery or reversely driving the external circuit element connected to the input terminal.

The controller 110 is connected to the Buck-Boost converter 105, the input terminal, and the output terminal, and is used for dynamically selecting an operation from the operation modes as an operation mode of the Buck-Boost converter 105 according at least one of the voltage change and current change that are associated with the Buck-Boost converter 105; the Buck-Boost converter 105 is arranged to dynamically performing mode switching according to the operation mode selected by the controller 110 so as to adjust and output the charging current or the driving current. In practice, the controller 110 comprises a voltage sensing circuit 1101, a current sensing circuit 1102, and a controlling circuit 1103. The voltage sensing circuit 1101 is connected to the input terminal, the output terminal, and the battery.

The voltage sensing circuit 1101 is used for sensing/detecting the voltage Vchg at the input terminal (i.e. the voltage at the input of Buck-Boost converter 105) and at least one of the system voltage Vsys and battery voltage Vbat of the battery. The results of voltage sensing are outputted from the voltage sensing circuit 1101 to the controlling circuit 1103. Accordingly, based on these results, the controlling circuit 1103 can determine under which operation mode the Buck-Boost converter 105 should operate and can correspondingly generate the PWM signals PWM1-PWM4 to the Buck-Boost converter 105. The controlling circuit 1103 can select one operation mode from these operation modes and determine the operation mode as one of the Buck-Boost converter 105 by comparing the detected voltage Vchg with the at least one of the system voltage Vsys and battery voltage Vbat.

The current sensing circuit 1102 is connected to the input terminal, two nodes between the transistor Q4, and optionally connected to two nodes between the transistor Q5. The current sensing circuit 1102 is used for sensing the current inputted to the switching mode charger 100 by detecting the current inputted to the Buck-Boost converter 105, and sensing the current outputted and provided for charging the battery by detecting the current passing through transistor Q4 or the current passing through transistor Q5. The current sensing circuit 1102 is arranged to detect the current passing through the Buck-Boost converter 105. The results of current sensing are outputted from the current sensing circuit 1102 to the controlling circuit 1103. Based on these results, the controlling circuit 1103 can determine whether to switch to a certain operation mode from another one or switch between two operation modes, so as to achieving the purpose of supplying/providing the rated current (i.e. the target large current) for charging the battery or the circuitry element connected to the input terminal of switching mode charger 100, i.e. achieving the purpose of fast charging. The controlling circuit 1103 can dynamically select one operation mode from these operation modes and determine the operation mode as one of the Buck-Boost converter 105 by comparing the detected current with the rated current (i.e. the target large current).

It should be noted that the controller 110 includes both the voltage sensing circuit 1101 and current sensing circuit 1102 in this embodiment. In another embodiment, the controller 110 may include one of the voltage sensing circuit 1101 and current sensing circuit 1102. The controller 110 can be arranged to select one operation mode from these operation modes and determine the operation mode as one of the Buck-Boost converter 105 according to either the voltage change or the current change. This modification also falls within the scope of the present invention.

The controlling circuit 1103 is further arranged to generate the PWM signal PWM5 to enable or disable the operation of power path block 115. In this embodiment, the power path block 115 comprises a transistor Q5 that is controlled by the PWM signal PWM5. The power path block 115 is used as a power path and high accuracy current sensing block. That is, the power path block 115 can be used to disconnect the system voltage Vsys and battery voltage Vbat so that the switching mode charger 100 can still provide the system voltage Vsys and a corresponding driving current for driving the system even though the battery is not connected to the switching mode charger 100; in this situation, the transistor Q5 is turned off. Also, the transistor Q5 can be used as a current sensing resistor when the transistor Q5 is turned on by the controlling circuit 1103. In addition, the power path block 115 is optional. That is, in other embodiments, the switching mode charger 100 may exclude the power path block 115. The switching mode charger 100 can still achieve fast charging by detecting the current passing through the transistor Q4 to sense the current outputted and provided for charging the battery.

In the following, Table T1 shows different operation modes corresponding to different scenarios associated with ON/OFF states of transistors Q1-Q5 as shown in FIG. 1:

TABLE T1

| Scenarios | Q1 | Q2 | Q3 | Q4 | Q5 | Operation modes |
|---|---|---|---|---|---|---|
| Vchg > Vsys or Vchg > Vbat | PWM switching | OFF | PWM switching | ON | ON | Buck mode |
| Vchg < Vsys, Vchg < Vbat, or Iout < Itar | ON | PWM switching | OFF | PWM switching | ON | Boost mode |
| Vchg ≈ Vsys, Vchg ≈ Vbat, or Iout ≈ Itar | PWM switching | PWM switching | PWM switching | PWM switching | ON | Buck-Boost mode |
| Vchg ≈ Vsys, Vchg ≈ Vbat, or Iout ≈ Itar | PWM switching | PWM switching | PWM switching | PWM switching | ON | Switch between Buck and Boost modes |

Figure 2A:
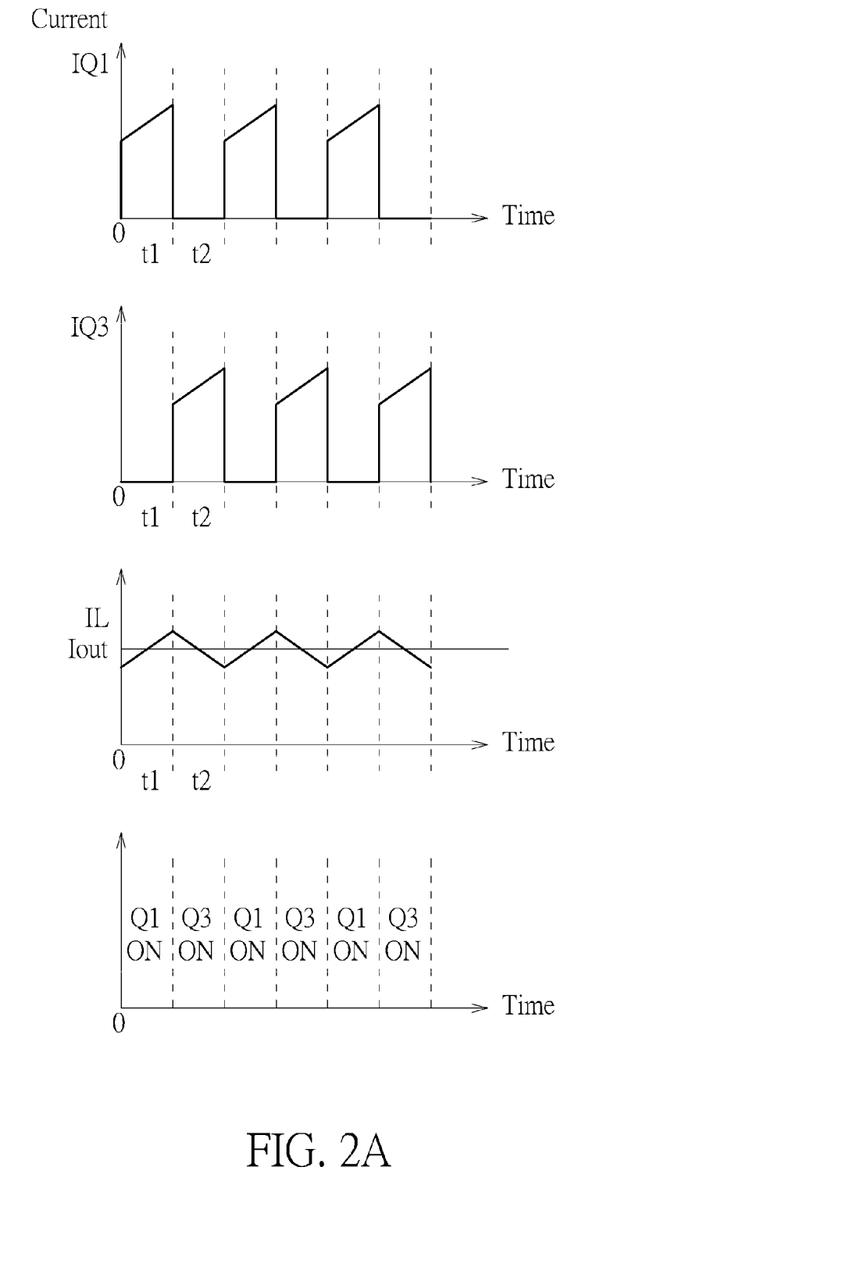
FIGS. 2A-2C are diagrams illustrating currents passing through transistors of the Buck-Boost converter of FIG. 1 and ON/OFF states of the transistors when the Buck-Boost converter operates under different operation modes.
Figure 2B:
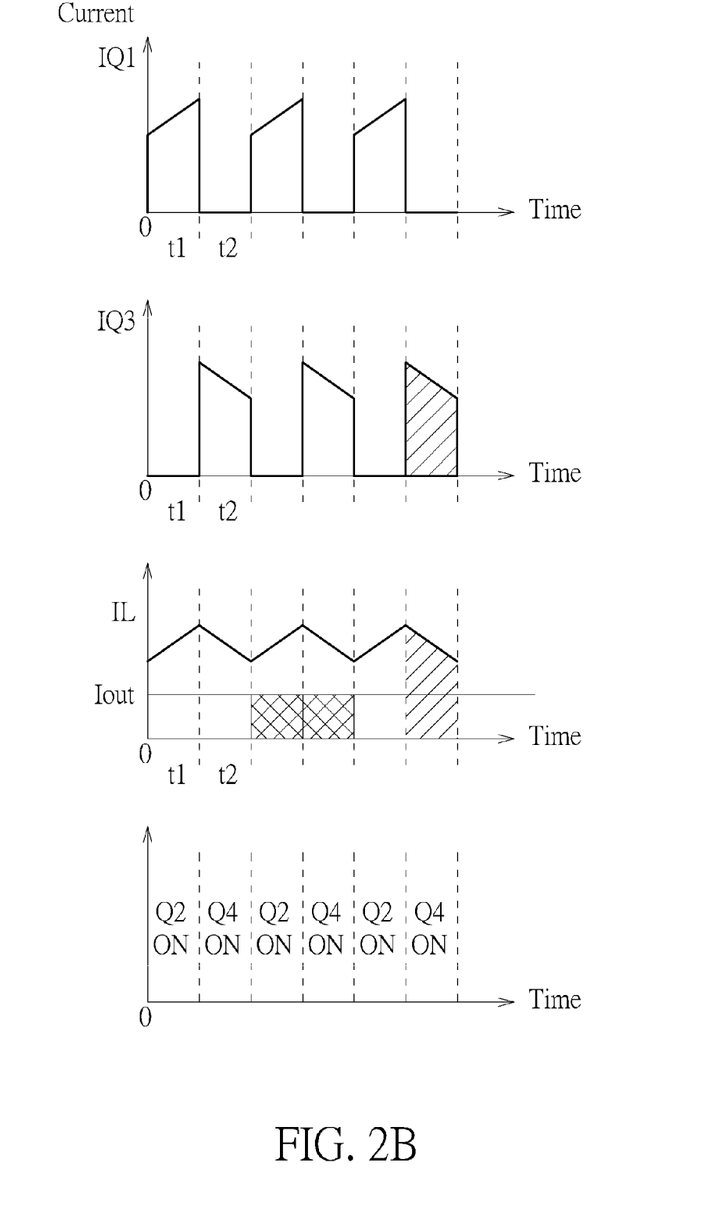
Figure 2C:
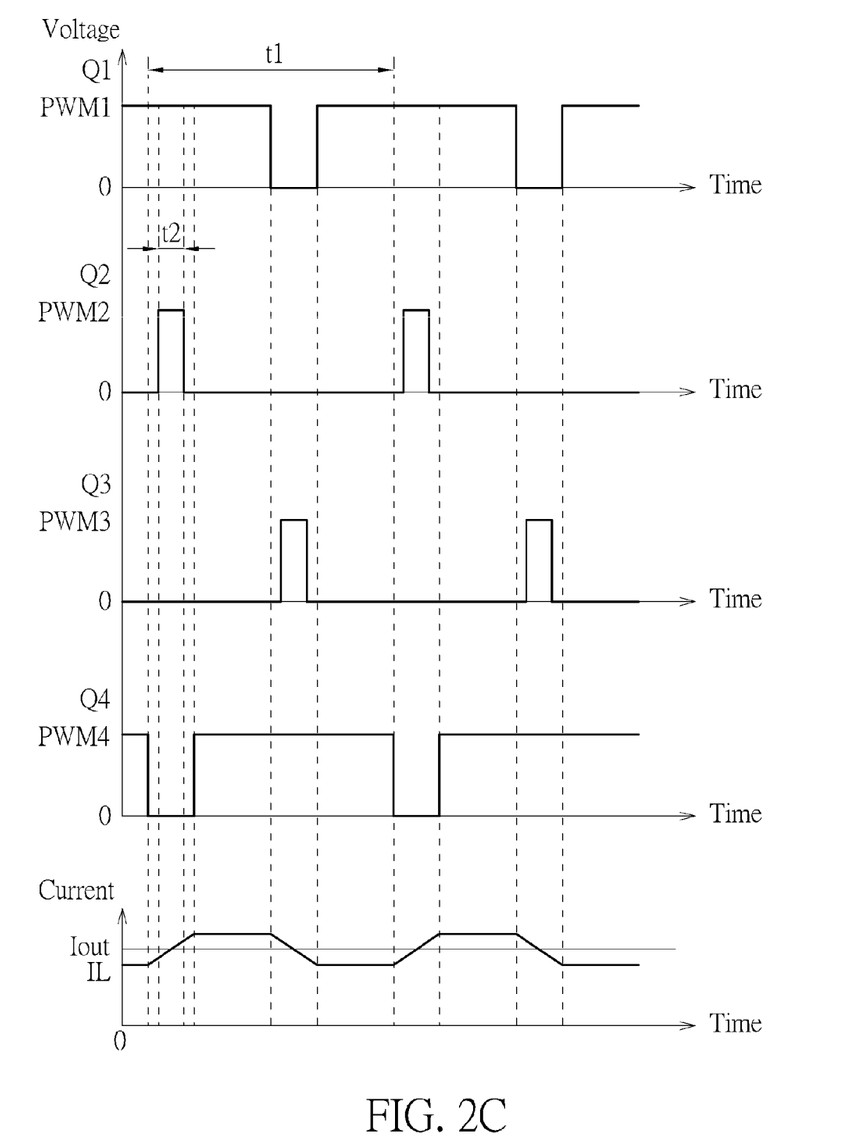

Please refer to Table T1 in conjunction with FIGS. 2A-2C. FIGS. 2A-2C are diagrams illustrating currents passing through transistors of the Buck-Boost converter 105 and the ON/OFF states of the transistors when the Buck-Boost converter 105 operates under different operation modes. As shown by Table T1 and FIG. 2A, in a first example of a first scenario, when the switching mode charger 100 senses that the voltage Vchg at the input terminal (i.e. the charger input voltage) is higher than the system voltage Vsys by using the voltage sensing circuit 1101 to detect the input voltage Vchg and the system voltage Vsys, the controller 110 determines that the Buck-Boost converter 105 should operate under the Buck mode, and generates the appropriate PWM signals PWM1-PWM5 to correspondingly control the states of transistors Q1-Q5. Additionally, in a second example of the first scenario, the controller 110 may determine that the Buck-Boost converter 105 should operate under the Buck mode when the switching mode charger 100 senses that the input voltage Vchg is higher than the battery voltage Vbat by using the voltage sensing circuit 1101 to detect the input voltage Vchg and the battery voltage Vbat. It should be noted that the system voltage Vsys may be approximate to the battery voltage Vbat when the switching mode charger 100 excludes the transistor Q5 in another embodiment. Specifically, when the Buck-Boost converter 105 operates under the Buck mode, the controller 110 controls the transistors Q1 and Q3 to use transistors Q1 and Q3 as PWM switching transistors, turns off the transistor Q2, and turn on the transistors Q4 and Q5. FIG. 2A shows the current IQ1 passing though the transistor Q1, the current IQ3 passing through the transistor Q3, the average loading current IL passing through the converter 105, and the ON/OFF states of transistors Q1 and Q3. It should be noted that the average loading current IL can be sensed by using the transistor Q4 and/or transistor Q5 and the loading current IL is continuous current. The average charging/output current Iout is substantially equal to the average loading current IL in this example. The controller 110 is arranged to sense the current passing through the transistors Q4 and/or Q5 so as to determine whether the Buck-Boost converter 105 should exit the Buck mode to enter another operation mode. That is, the current sensing circuit 1102 of controller 110 can sense a current passing through a switching transistor included within the Buck-Boost converter 105 and/or a current passing through the power path block 115 that is disposed between the output terminal and the Buck-Boost converter 105, to detect the current passing through the Buck-Boost converter 105.

In this embodiment, the switching mode charger 100 is designed to be still capable of supplying a rated current (i.e. a target large current) Itar for the battery so as to achieve fast charging even though cable line loss exists or a large voltage variation is introduced to the input voltage. Originally, when the switching mode charger 100 senses that the voltage Vchg at the input terminal is higher than the system voltage Vsys or higher than the battery voltage Vbat, the controller 110 determines that the Buck-Boost converter 105 should operate under the Buck mode, and the switching mode charger 100 is arranged to supply an output voltage lower than the input voltage Vchg for charging the battery. In this situation, ideally the switching mode charger 100 is capable of proving the output current Tout which is substantially equal to the target large current Itar to charge the battery. Practically, some cable line losses may exist or the large voltage variation may be introduced to the input voltage Vchg. This may cause that the switching mode charger 100 cannot output the target large current Itar for the battery since it is inevitable that the voltage difference between the battery voltage Vbat and input voltage Vchg becomes smaller due to the cable line losses or introduced voltage variation. Thus, in practice, the switching mode charger 100 is arranged to output the output voltage higher than the input voltage Vchg for charging the battery so that the switching mode charger 100 can still supply the target large current Itar for the battery to achieve fast charging. Specifically, when sensing that the average charging/output current Tout is smaller than the target large current Itar (i.e. the detected current is smaller than the target current), the controller 110 selects the Boost mode from these operation modes as one operation mode of the Buck-Boost converter 105, and is arranged to cause the Buck-Boost converter 105 exit from the Buck mode and enter the Boost mode. That is, the Buck-Boost converter 105 is arranged to switch from the Buck mode to the Boost mode. Thus, the switching mode charger 100 can provide a higher output voltage, and can adjust and output the charging current that is substantially equal to the target large current Itar for the battery.

Under the Boost mode, as shown by a third example of the second scenario, the controller 110 controls the transistors Q2 and Q4 to use the transistors Q2 and Q4 as PWM switching transistors, turns on the transistors Q1 and Q5, and turns off the transistor Q3. FIG. 2B illustrates the current IQ2 passing though the transistor Q2, the current IQ4 passing through the transistor Q4, the loading current IL passing through the converter 105, and ON/OFF states of transistors Q2 and Q4. The controller 110 can obtain the average loading current IL to calculate the average charging/output current Iout by detecting the discontinuous current IQ4 passing through the transistor Q4 when the transistor Q4 is turned on and/or by detecting the continuous current passing through the transistor Q5. The current IQ4 passing through the transistor Q4 can be determined by the following equation:

$$Iout = IL \times t1/(t1+t2)$$

t1 indicates time periods when the switching transistor Q2 is turned on, and t2 indicates time periods when the switching transistor Q4 is turned on.

Afterwards, when sensing that the average charging/output current Tout is approximate to the target large current Itar (i.e. the detected current is near to the target current), the controller 110 determines that the Buck-Boost converter 105 should operate under the Buck-Boost mode or should switch between the Buck and Boost modes. For example, the controller 110 can select the Buck-Boost mode from these operation modes as one operation mode of the Buck-Boost converter 105. Under the Buck-Boost mode, the Buck-Boost converter 105 can finely raise or reduce the voltage outputted by the Buck-Boost converter 105, so that the switching mode charger 100 is capable of finely adjusting an output voltage that is provided by for the battery at the output terminal. Additionally, when sensing that the average charging/output current Iout is approximate to the target large current Itar (i.e. the detected current is near to the target current), the controller 100 can dynamically select one of the Buck mode and Boost mode as one operation mode of the Buck-Boost converter 105 to control the Buck-Boost converter 105 to switch between the Buck and Boost modes. This can also achieve that the switching mode charger 100 is capable of finely adjusting an output voltage that is provided by for the battery at the output terminal.

Specifically, the controller 110 is arranged to control the transistors Q1-Q4 to use the transistors Q1-Q4 as switching transistors and turn on the transistor Q5, as shown by the third examples of the third and fourth scenarios. FIG. 2C shows a diagram of the current IQ1-IQ4 respectively passing though the switching transistors Q1-Q4, the loading current IL passing through the converter 105, and ON/OFF states of transistors Q1-Q4 when the Buck-Boost converter 105 operates under the Buck-Boost mode. As shown in FIG. 2C, the controller 110 can obtain the average loading current IL to calculate the average charging/output current Tout by detecting the discontinuous current IQ4 passing through the transistor Q4 when the transistor Q4 is turned on and/or by detecting the continuous current passing through the transistor Q5. In a preferred example, the controller 110 is arranged to calculate the average charging/output current Iout by detecting the continuous current passing through the transistor Q5; the transistor Q5 is used as a current sensing resistor.

Additionally, in another example, the controller 110 can set a programmable tolerance range for the target large current as plus and minus ten percent. When the controller 110 senses that the average charging/out current Iout falls within the programmable tolerance range, the controller 110 determines that the Buck-Boost converter 105 should switch between the Buck and Boost modes in a specific cycle. That is, the operations of the transistors Q1-Q4 as respectively shown in FIGS. 2A and 2B take place alternatively. The controller 110 can obtain the average loading current IL to calculate the average charging/output current Iout by detecting the discontinuous current IQ4 passing through the transistor Q4 when the transistor Q4 is turned on and/or by detecting the continuous current passing through the transistor Q5.

Additionally, in the first example of the second scenario, when the switching mode charger 100 senses that the input voltage Vchg at the input terminal is lower than the system voltage Vsys by using the voltage sensing circuit 1101 to detect the input voltage Vchg and the system voltage Vsys, the controller 110 determines that the Buck-Boost converter 105 should operate under the Boost mode, and generates the appropriate PWM signals PWM1-PWM5 to correspondingly control the ON/OFF states of transistors Q1-Q5. In addition, in the second example of this scenario, the controller 110 may determine that the Buck-Boost converter 105 should operate under the Boost mode when the switching mode charger 100 senses that the voltage Vchg at the input terminal is lower than the battery voltage Vbat by using the voltage sensing circuit 1101 to detect the input voltage Vchg and the battery voltage Vbat. It should be noted that the system voltage Vsys may be approximate to the battery voltage Vbat when the switching mode charger 100 excludes the transistor Q5 in another embodiment. Similarly, when the Buck-Boost converter 105 operates under the Boost mode, the controller 110 controls the transistors Q2 and Q4 to use the transistors Q2 and Q4 as the PWM switching transistors, turns off the transistor Q3, and turns on the transistors Q1 and Q5. Further description of the operation of Buck-Boost converter 105 operating under the Boost mode is not detailed for brevity.

Additionally, in the first examples of third and fourth scenarios, when the switching mode charger 100 senses that the voltage Vchg at the input terminal is approximate to the system voltage Vsys by using the voltage sensing circuit 1101 to detect the input voltage Vchg and the system voltage Vsys, the controller 110 determines that the Buck-Boost converter 105 should operate under the Buck-Boost mode or should switch between the Buck and Boost modes in a specific cycle, and generates the appropriate PWM signals PWM1-PWM5 to correspondingly control the ON/OFF states of transistors Q1-Q5. In addition, in the second examples of third and fourth scenarios, the controller 110 may determine that the Buck-Boost converter 105 should operate under the Buck-Boost mode or should switch between the Buck and Boost modes in a specific cycle when the switching mode charger 100 senses that the voltage Vchg at the input terminal is approximate to the battery voltage Vbat by using the voltage sensing circuit 1101 to detect the input voltage Vchg and the battery voltage Vbat. Similarly, when the Buck-Boost converter 105 operates under the Buck-Boost mode or switches between the Buck and Boost modes, the controller 110 controls the transistors Q1-Q4 to use the transistors Q1-Q4 as PWM switching transistors and turns on the transistor Q5. Further description of the operations of Buck-Boost converter 105 operating under the Buck-Boost mode or switching between the Buck and Boost modes is not detailed for brevity.

In a second embodiment of the present invention, the switching mode charger 100 can used for providing a current for driving the external circuit element connected to the input terminal of the switching mode charger 100 by using the power of the battery, so as to support the On-The-Go (OTG) function of USB specification. In this situation, for example, the Buck-Boost converter 105 operates under the Boost mode so that the switching mode charger 100 is capable of supplying a higher voltage level at the input terminal for driving the above-mentioned circuit element based on the battery voltage. For example, the switching mode charger 100 can supply the higher voltage level of 5 Volts for the circuit element based on the battery voltage of 4.2 Volts. In addition, when the Buck-Boost converter 105 operates under the Buck mode, the switching mode charger 100 supplies a lower voltage level at the input terminal for driving the above-mentioned circuit element based on the power of the battery. For example, the switching mode charger 100 can supply 3.3 Volts based on the battery voltage of 4.2 Volts. In the following, Table T2 shows different operation modes corresponding to different scenarios associated with ON/OFF states of transistors Q1-Q5 as shown in FIG. 1 when the switching mode charger 100 executes the OTG operation:

TABLE T2

| Scenarios | Q1 | Q2 | Q3 | Q4 | Q5 | Operation modes |
|---|---|---|---|---|---|---|
| Vchg > Vbat | PWM switching | OFF | PWM switching | ON | ON | Boost mode |
| Vchg < Vbat | ON | PWM switching | OFF | PWM switching | ON | Buck mode |
| Vchg ≈ Vbat or I1 ≈ Itar | PWM switching | PWM switching | PWM switching | PWM switching | ON | Buck-Boost mode |
| Vchg ≈ Vbat or I1 ≈ Itar | PWM switching | PWM switching | PWM switching | PWM switching | ON | Switch between Buck and Boost modes |

I1 indicates the current for driving the external circuit element when the switching mode charger 100 executes the OTG operation. The description of the operations for controlling the ON/OFF states of transistors Q1-Q5 when the switching mode charger 100 executes the OTG operation are similar to that of the operations for controlling the ON/OFF states of transistors Q1-Q5 when the switching mode charger 100 charges the battery. Further description is not detailed for brevity.

Additionally, it should be noted that the structure of the Buck-Boost converter 105 can provide a break reverse current function for the battery to the input terminal of the switching mode charger 100. When the switching mode charger 100 is charging the battery, no currents flow back to the input terminal once the transistor Q4 is turned off.

Further, the target large current Itar can be estimated by using the current sensing circuit 1102 to sense the current inputted to the Buck-Boost converter 105 when the switching mode charger 100 is used for charging the battery. This modification also falls within the scope of the present invention.

In summary, the switching mode charger 100 integrates the operations of Buck and Boost modes and uses the transistor Q4 of the Buck-Boost converter 105 as current sensing element. Thus, this can achieve the requirements of low cost and high efficiency. The structure of switching mode charger 100 can be applied for various different kinds of input power sources such as various AC-to-DC adaptors, standard USB host port, USB charging port, car adaptors, and wireless chargers. In addition, the switching mode charger 100 can support chargers that include different input voltages.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A switching mode charger capable of performing mode switching to adjust and output a charging current for a battery or a driving current for an external circuit element in response to voltage change or current change, comprising:
   an input terminal;
   an output terminal;
   a Buck-Boost converter, for generating a voltage at the input terminal according to a voltage at the output terminal or generating a voltage at the output terminal according to a voltage at the input terminal; and
   a controller, coupled to the Buck-Boost converter, the input terminal, and the output terminal, for dynamically selecting an operation mode from a plurality of operation modes as an operation mode of the Buck-Boost converter according to at least one of the voltage change and the current change that are associated with the Buck-Boost converter, wherein the Buck-Boost converter is arranged to dynamically performing mode switching according to the operation mode selected by the controller, so as to adjust and output the charging current or the driving current;
   wherein the controller is arranged to, in response to a detected current of the Buck-Boost converter approaching a target current:
      select a Buck-Boost mode from the plurality of operation modes as the operation mode of the Buck-Boost converter, and control the Buck-Boost converter to operate in the Buck-Boost mode, at least in part by:
         calculating an average output current of the Buck-Boost converter, and
         generating PWM signals to control four switching transistors of an H-Bridge structure of the Buck-Boost converter based on the average output current.

2. The switching mode charger of claim 1, wherein the controller includes a current sensing circuit configured to detect the detected current and the controller is further configured to dynamically select the operation mode based on the detected current.

3. The switching mode charger of claim 2, wherein the Buck-Boost converter includes a Buck mode and a Boost mode, and the Buck-Boost converter is arranged to provide a first voltage level as an output voltage when operating under the Buck mode; and, when the detected current is smaller than the target current, the controller is arranged to select the Boost mode from the plurality of operations modes as the operation mode of the Buck-Boost converter so as to control the switching mode charger to switch from the Buck mode to enter the Boost mode and cause the switching mode charger to provide a second voltage level as the output voltage and adjust/output the charging current that is substantially equal to the target current, the second voltage level being higher than the first voltage level.

4. The switching mode charger of claim 2, wherein the Buck-Boost converter includes a Buck mode and a Boost mode; and, when the detected current is near to the target current, the controller is arranged to dynamically select one of the Buck mode and the Boost mode as the operation mode of the Buck-Boost converter to control the buck-Boost converter to switch between the Buck mode and the boost mode, so that the switching mode charger is capable of finely adjusting an output voltage which is provided by the switching mode charger at the output terminal.

5. The switching mode charger of claim 2, wherein the current sensing circuit is arranged to sense a current passing through a switching transistor included within the Buck-Boost converter and/or to sense a current passing through a power path block that is disposed between the output terminal and the Buck-Boost converter, so as to detect the current passing through the Buck-Boost converter.

6. The switching mode charger of claim 1, wherein the controller includes a voltage sensing circuit and a controlling circuit; the voltage sensing circuit is used for detecting a voltage at an input of the Buck-Boost converter and at least one of a battery voltage and a system voltage; and the controlling circuit is coupled to the voltage sensing circuit and utilized for selecting one operation mode from the plurality of operation modes as the operation mode of the buck-Boost converter by comparing the detected voltage with the at least one of the battery voltage and the system voltage.

7. The switching mode charger of claim 6, wherein the Buck-Boost converter includes a Buck mode and a Boost mode; the controller determines that the Buck-Boost converter operates under the Buck mode when the switching mode charger provides the charging current for the battery and the detected voltage is higher than the at least one of the battery voltage and the system voltage; and, the controller determines that the Buck-Boost converter operates under the Boost mode when the switching mode charger provides the charging current for the battery and the detected voltage is lower than the at least one of the battery voltage and the system voltage.

8. The switching mode charger of claim 6, wherein the Buck-Boost converter includes a Buck mode and a Boost mode; the controller determines that the Buck-Boost converter operates under the Boost mode when the switching mode charger provides the driving current for the external circuit element connected to the input terminal and the detected voltage is higher than the at least one of the battery voltage and the system voltage; and, the controller determines that the Buck-Boost converter operates under the Buck mode when the switching mode charger provides the driving current for the external circuit element connected to the input terminal and the detected voltage is lower than the at least one of the battery voltage and the system voltage.

9. The switching mode charger of claim 6, wherein, when the detected voltage is near to the at least one of the battery voltage and the system voltage, the controller is arranged to select the Buck-Boost mode from the plurality of operation modes as the operation mode of the Buck-Boost converter, so that the switching mode charger is capable of finely adjusting an output voltage which is provided by the switching mode charger at the output terminal.

10. The switching mode charger of claim 6, wherein the Buck-Boost converter includes a Buck mode and a Boost mode; and, when the detected voltage is near to the at least one of the battery voltage and the system voltage, the controller is arranged to dynamically select one of the Buck mode and the Boost mode as the operation mode of the Buck-Boost converter to control the Buck-Boost converter to switch between the Buck mode and the Boost mode, so that the switching mode charger is capable of finely adjusting an output voltage which is provided by the switching mode charger at the output terminal.

11. A method applied into a switching mode charger capable of performing mode switching to adjust and output a charging current for a battery or a driving current for an external circuit element in response to voltage change or current change, comprising:
using a Buck-Boost converter to generate a voltage at an input terminal according to a voltage at an output terminal or generate a voltage at the output terminal according to a voltage at the input terminal;
dynamically selecting an operation mode from a plurality of operation modes as an operation mode of the Buck-Boost converter according to at least one of the voltage change and the current change that are associated with the Buck-Boost converter; and
dynamically performing mode switching according to the operation mode selected, so as to adjust and output the charging current or the driving current;
wherein in response to a detected current of the Buck-Boost converter approaching a target current the method further comprises:
selecting a Buck-Boost mode from the plurality of operation modes as the operation mode of the Buck-Boost converter,
calculating an average output current of the Buck-Boost converter, and
generating PWM signals to control four switching transistors of an H-Bridge structure of the Buck-Boost converter based on the average output current.

12. The method of claim 11, further comprising:
detecting a current passing through the Buck-Boost converter; and the step of dynamically selecting an operation mode from a plurality of operation modes comprises:
dynamically selecting the operation mode from the plurality of operation modes as the operation mode of the Buck-Boost converter by comparing the detected current with the target current.

13. The method of claim 12, wherein the Buck-Boost converter includes a Buck mode and a boost mode, and the method further comprises:
using the Buck-Boost converter to provide a first voltage level as an output voltage when the Buck-Boost converter operates under the Buck mode; and
when the detected current is smaller than the target current, selecting the Boost mode from the plurality of operations modes as the operation mode of the Buck-Boost converter so as to control the switching mode charger to switch from the Buck mode to enter the Boost mode and cause the switching mode charger to provide a second voltage level as the output voltage and adjust/output the charging current that is substantially equal to the target current, the second voltage level being higher than the first voltage level.

14. The method of claim 12, wherein the Buck-Boost converter includes a Buck mode and a Boost mode, and the method further comprises:
when the detected current is near to the target current, dynamically selecting one of the Buck mode and the Boost mode as the operation mode of the Buck-Boost converter to control the Buck-Boost converter to switch between the Buck mode and the Boost mode, so that the switching mode charger is capable of finely adjusting an output voltage which is provided by the switching mode charger at the output terminal.

15. The method of claim 12, wherein the step of detecting a current passing through the Buck-Boost converter comprises:
sensing a current passing through a switching transistor included within the Buck-Boost converter and/or to sense a current passing through a power path block that is disposed between the output terminal and the Buck-Boost converter, so as to detect the current passing through the Buck-Boost converter.

16. The method of claim 11, further comprising:
detecting a voltage at an input of the Buck-Boost converter and at least one of a battery voltage and a system voltage; and
the step of dynamically selecting an operation mode from a plurality of operation modes comprises:
selecting one operation mode from the plurality of operation modes as the operation mode of the Buck-Boost converter by comparing the detected voltage with the at least one of the battery voltage and the system voltage.

17. The method of claim 16, wherein the Buck-Boost converter includes a Buck mode and a boost mode, and the method further comprises:
determining that the Buck-Boost converter operates under the Buck mode when the switching mode charger provides the charging current for the battery and the detected voltage is higher than the at least one of the battery voltage and the system voltage; and
determining that the Buck-Boost converter operates under the boost mode when the switching mode charger provides the charging current for the battery and the detected voltage is lower than the at least one of the battery voltage and the system voltage.

18. The method of claim 16, wherein the Buck-Boost converter includes a Buck mode and a Boost mode, and the method further comprises:
determining that the Buck-Boost converter operates under the Boost mode when the switching mode charger provides the driving current for the external circuit element connected to the input terminal and the detected voltage is higher than the at least one of the battery voltage and the system voltage; and
determining that the Buck-Boost converter operates under the Buck mode when the switching mode charger provides the driving current for the external circuit element connected to the input terminal and the detected voltage is lower than the at least one of the battery voltage and the system voltage.

19. The method of claim 16, wherein the method further comprises:
when the detected voltage is near to the at least one of the battery voltage and the system voltage, selecting the Buck-Boost mode from the plurality of operation modes as the operation mode of the Buck-Boost converter, so that the switching mode charger is capable of finely adjusting an output voltage which is provided by the switching mode charger at the output terminal.

20. The method of claim 16, wherein the Buck-Boost converter includes a Buck mode and a Boost mode, and the method further comprises:
when the detected voltage is near to the at least one of the battery voltage and the system voltage, dynamically selecting one of the Buck mode and the Boost mode as the operation mode of the Buck-Boost converter to control the buck-Boost converter to switch between the Buck mode and the Boost mode, so that the switching mode charger is capable of finely adjusting an output voltage which is provided by the switching mode charger at the output terminal.

* * * * *